(12) United States Patent
Heger et al.

(10) Patent No.: US 6,989,662 B2
(45) Date of Patent: Jan. 24, 2006

(54) SENSOR AUTO-RECALIBRATION

(75) Inventors: Charles E. Heger, Saratoga, CA (US); Lawrence F. Miller, Los Gatos, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 10/835,654

(22) Filed: Apr. 29, 2004

(65) Prior Publication Data

US 2005/0242800 A1   Nov. 3, 2005

(51) Int. Cl.
*G01R 27/26*   (2006.01)
*G01R 19/00*   (2006.01)

(52) U.S. Cl. .......................... 324/67; 324/202

(58) Field of Classification Search ................. 324/67, 324/228–243, 326, 658, 662, 686, 66, 601, 324/663, 671–672, 676
See application file for complete search history.

(56) References Cited

U.S. PATENT DOCUMENTS

| 4,464,622 | A | | 8/1984 | Franklin |
| 5,619,128 | A | * | 4/1997 | Heger ......................... 324/67 |
| 6,023,159 | A | | 2/2000 | Heger |
| 2001/0010460 | A1 | | 8/2001 | Miller et al. |
| 2004/0000918 | A1 | | 1/2004 | Sanoner et al. |

OTHER PUBLICATIONS

International Search Report mailed Aug. 1, 2005, for PCT Application No. PCT/US2005/015298 filed Apr. 29, 2005, 7 pages.
Written Opinion mailed Aug. 1, 2005, for PCT Application No. PCT/US2005/015298 filed Apr. 29, 2005, 6 pages.

* cited by examiner

*Primary Examiner*—Bot Ledynh
(74) *Attorney, Agent, or Firm*—Morrison & Foerster LLP

(57) ABSTRACT

A sensor and method that detects a mis-calibration and automatically recalibrates itself without operator intervention. If the sensor determines that it was calibrated over an object such as a stud, the sensor may automatically update the calibration value with a new lower value without operator intervention. This process may repeat until the calibration value is set to a value that represents the wall covering alone without hidden objects behind it.

20 Claims, 5 Drawing Sheets

SENSOR AUTO-RECALIBRATION

BACKGROUND OF THE INVENTION

1. Field of Invention

The present invention relates to sensors that detect objects, such as studs, behind a wall covering, such as sheetrock, and more particularly to sensors that detect and correct a miscalibration.

2. Description of Related Art

U.S. Pat. No. 4,464,622 entitled "Electronic wall stud sensor," issued Aug. 7, 1984, and incorporated in its entirety by reference herein, discloses an electronic wall stud sensor particularly suitable for locating a stud positioned behind a wall surface. (A "stud" is a structural member of a building to which an interior wall surface such as wall board or paneling is affixed.) Typically in the U.S., "2-by-4" wooden studs are used in construction. Nominally, a 2-by-4 stud is 51 mm (2 inches) wide and 102 mm (4 inches) deep and of any suitable length. The actual dimensions of a 2-by-4 are more typically 38 mm (1½ inches) wide and 89 mm (3½ inches) deep. Use of English units (inches) and U.S. stud sizes here is in conformance with U.S. construction practice and is not intended to be limiting, but is only illustrative. Finding studs is a typical problem for building repairs, picture hanging, etc.

The sensor detects the stud by measuring a change in capacitance due to a change in the dielectric constant along the wall. Due to the placement of the studs, a wall surface exhibits changing dielectric constants while the sensor is moved along the wall's surface. The sensor includes a plurality of capacitor plates, a circuit for detecting changes in the capacitance, and an indicator.

The plurality of capacitor plates is mounted in the sensor such that they can be positioned close to a wall's surface. In operation, an operator places a sensor over a covering surface (such as a wall, floor or ceiling). When the capacitor plates are drawn along the surface, the circuit detects a change in the capacitance of the plates due to a change in the average dielectric constant of the surface. A combination of a wall or other surface covering and an underlying stud or other member has a larger capacitance than a wall covering alone without a stud. The capacitor plates are used to measure the effective capacitance or change in capacitance of a wall.

After the sensor is placed against the wall and before detection begins, the sensor first performs a calibration to null out the effect of a wall in the absence of a stud. The sensor initially calibrates itself by determining a calibration value that may be used as a reference value. If an operator placed the sensor over an object (such as a stud or joist) hidden behind the covering surface during calibration, the sensor may detect a capacitance greater than a capacitance representing just the wall covering. As a result, the sensor may store an erroneous calibration value.

A sensor may detect the erroneous calibration value, alert the operator to begin the calibration process again, and halt the capacitance measurement process. Thus, the operator is forced to recognize the alert and know to reinitialize the calibration process by restarting the sensor over a new area of the wall covering. It may be desirable to automatically recalibrate a sensor that was erroneously calibrated over a hidden object.

SUMMARY

Some embodiments provide a method of recalibrating a stud sensing device for finding a location of a stud positioned behind a surface, the method comprising the acts of: holding the stud sensing device at a first location on the surface; placing the stud sensing device in an calibration mode; sensing a first density at the first location in the calibration mode; setting a calibration value based on the first sensed density; placing the stud sensing device in an operating mode; moving the stud sensing device to a second location on the surface; sensing a second density at the second location; setting a second density value based on the second sensed density; determining whether the stud sensing device was calibrated over a stud; and recalibrating the stud sensing device if the stud sensing device was calibrated over the stud.

Some embodiments provide a stud sensing device capable of automatically recalibrating if it has erroneously been calibrated at a location over a stud, the stud sensing device comprising: a first memory adapted to hold a calibration value; a second memory adapted to hold a sensed value; a sensor adapted to be applied to a surface, thereby determining a density behind the surface and providing the sensed value, wherein the sensor is operationally coupled to the second memory; a comparator adapted to compare the first memory location to the second memory location, thereby determining if the calibration value represents a value sensed over the stud, wherein the comparator is operationally coupled to the first and second memories; and an updater adapted to update the first memory with an updated calibration value, wherein the updater is operationally coupled to an output of the comparator.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings, which illustrate several embodiments of the present invention. It is understood that other embodiments may be realized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

In operation, an operator places a sensor over a covering surface (such as a wall, floor, or ceiling). The sensor initially calibrates itself by determining a calibration value that may be used as a reference value. The operator may have unknowingly placed the sensor over an object (such as a stud or joist) hidden behind the covering surface. If the operator placed the sensor over an object hidden behind the covering surface, the sensor may measure a capacitance greater than a capacitance representing just the wall covering. As a result, the sensor may store an erroneous calibration value.

With time, the sensor takes additional capacitance measurements. As the operator slides the sensor across the surface, resulting capacitance measurements may be larger or smaller than the stored calibration value. If the calibration value is too high in comparison to the additional capacitance measurements, the sensor may not detect a stud or may identify the stud as narrower than its actual width.

In accordance with the present invention, if the sensor determines that it was calibrated over or near a hidden object, the sensor may automatically update the calibration value with a new lower value without operator intervention. This process may repeat until the calibration value is set to a value that represents the wall covering alone without hidden objects behind it. In addition, embodiments of this invention may be used with single plate sensor, sensors having side plates, sensors having two or more plates of similar area, or ratiometric sensors.

Figure 1A:
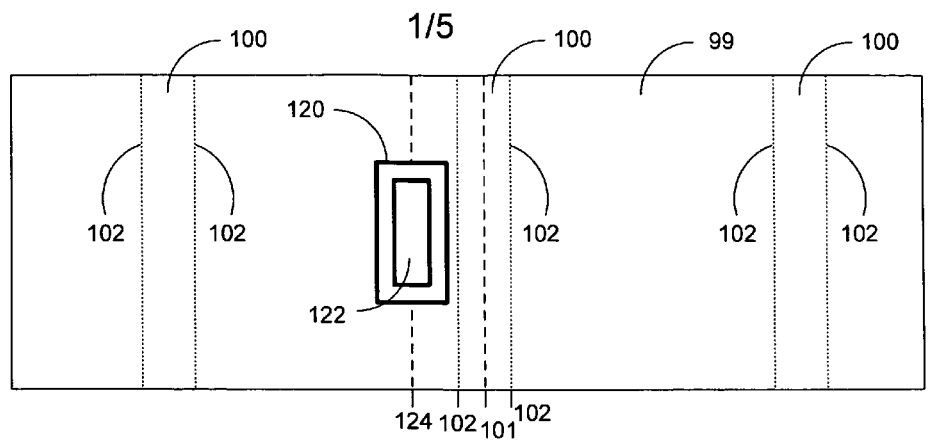
FIGS. 1A–1C illustrate a plan view of a prior art single plate capacitive sensor positioned against a wall at a lateral distance away from a hidden stud and the capacitance produced by the sensor and the wall.

FIG. 1A illustrates a plan view of a known capacitive sensor 120 having a single plate 122 positioned against a wall structure 99 at a lateral distance D away from a hidden stud 100. Each stud 100 has two edges 102 and defines a centerline 101 relative to its positioning to the wall 99.

Figure 1B:
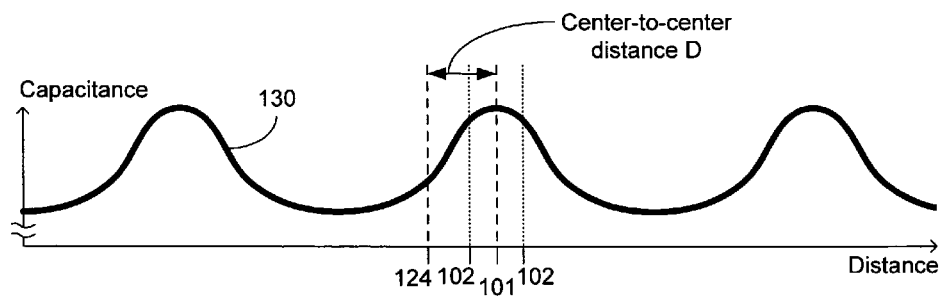
Figure 1C:
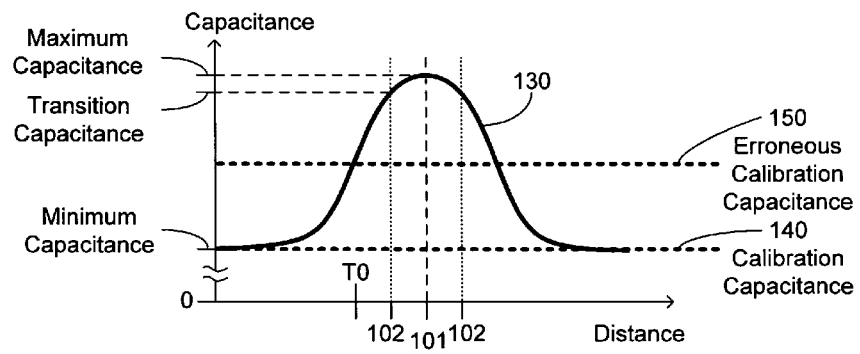

FIGS. 1B and 1C illustrate graphically a capacitance produced between the plate 122 and the wall 99. A capacitance curve 130 shows peaks at the centerline 101 of each stud 100 and a valley between a neighboring pair of studs 100. The capacitance curve 130 shows a minimum capacitance value when the sensor 120 is directly between the pair of studs 100. To mark an edge 102 of a stud 100, a sensor 120 uses a transition capacitance as a reference. To mark a centerline 101 of a stud 100, a sensor 120 must detect the peak of the capacitance curve 130.

As capacitance curve 130 passes through a transition capacitance value, the centerline 124 of the sensor 120 may be approximately over an edge 102 of the stud 100. While the capacitance is above this value, the sensor 120 may indicate it is over the stud 100. The transition capacitance value may be set at the factor and may be less useful in locating edges and centers of studs located behind wall structures having unknown thicknesses and studs having non-standard widths. Alternatively, the transition capacitance may be set to an offset value above the calibration value.

During calibration, a sensor may set an initial calibration value. If an operator placed the sensor between two studs, at a point where the measured capacitance is a minimum, the sensor may set the calibration value to a value that represents a calibration capacitance 140. If the operator placed the sensor over or near a stud, the measured capacitance may be a non-minimum value. As a result, the sensor may set the calibration value to a value that is too large, such as a value that represents an erroneous calibration capacitance 150.

Figure 2:
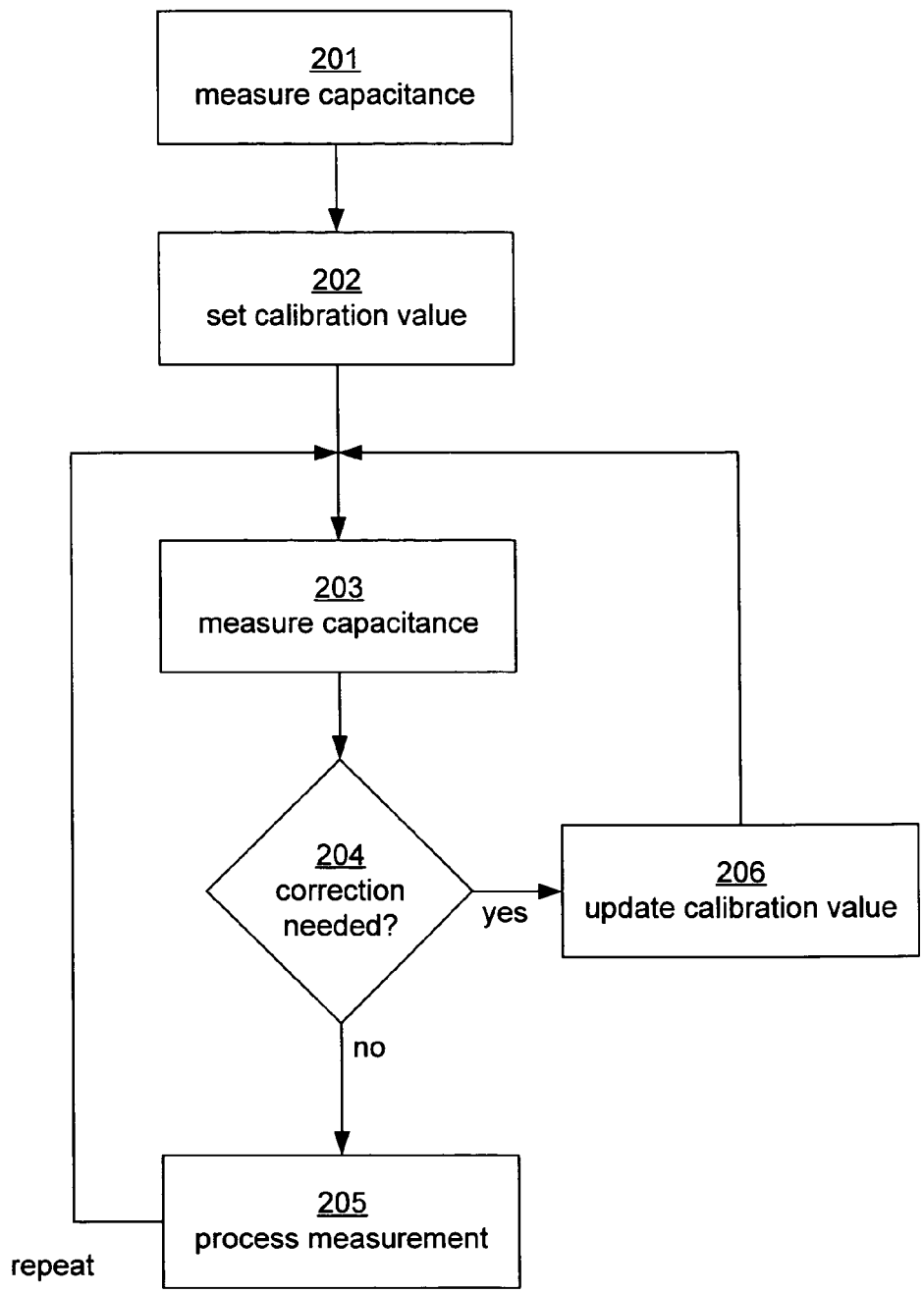
FIG. 2 shows a flow chart of an auto-recalibration process, in accordance with the present invention.

FIG. 2 shows a flow chart of an auto-recalibration process, in accordance with the present invention. At step 201, a sensor begins calibration by taking a first capacitance measurement of the wall covering. At step 202, the sensor uses the measured capacitance of the wall covering as a reference for future measurements. The sensor may store the reference as a calibration value in a first associated memory.

At step 203, the sensor begins normal operation. A new capacitance measurement is taken by the sensor. The sensor may store the new capacitance measurement as a current measurement value in a second associated memory.

At step 204, the current capacitance measurement is used to determine if the calibration value is a proper calibration value. A proper calibration value may be a value that represents a capacitance of just a wall covering without substantial influence from studs and other objects. An improper calibration value may have been taken over or near a stud or metal wiring. An improper calibration value may make a sensor ineffective or less effective at detecting an edge of a stud.

Step 204, checking whether a correction is needed to the calibration value, may be executed with each new capacitance measurement. Alternatively, the calibration value may be checked at various times with one or more methods. For example, the calibration value may be checked with every $N^{th}$ new capacitance measurement or may be checked periodically. The calibration value may be checked intermittently. The calibration value may be checked during a first few seconds after initialization. The calibration value may be checked after a time-out period has elapsed in which a stud has not been detected.

For example, a calibration value may be checked every $\frac{1}{10}^{th}$ of a second for the first 5 seconds then not checked again unless 15 seconds has passed without detection of a stud. Alternatively, a calibration value may be checked every $\frac{1}{5}^{th}$ of a second while the sensor is operating. Alternatively, a calibration value may be checked with every new capacitance measurement taken.

A calibration value may be deemed improper if a new capacitance measurement is less than the calibration value. Alternatively, a calibration value may be deemed improper if a new capacitance measurement is within an offset value from the calibration value. For example, if the calibration value is 115 and the offset value is 10, a new capacitance measurement may be deemed improper if the new capacitance measurement was 105 or less. Additionally, a calibration value may be deemed improper if an average or a running average of a series of new capacitance measurements is within an offset value from the calibration value. A running average may be computed by an arithmetic mean. A running average may be to a median value. A running average may be a computation of new capacitance measurements after excluding extreme or abnormal values.

If the calibration value is proper, processing continues at step 206. The new capacitance measurement along with the calibration value may be used to detect edges and/or a center-line of an object.

If the calibration value is improper, the calibration value may be updated at step 207. If the calibration value is updated, it may be replaced with a new value. The calibration value may be updated by one of a variety of methods. For example, the calibration value may be updated with a copy of the new capacitance measurement. Alternatively, the calibration value may be decremented by a fraction of the difference between the prior calibration value and new capacitance measurement. Alternatively, the calibration value may be decremented by a fraction of the difference between the prior calibration value and another value such as a running average of new capacitance measurements. Additionally, the calibration value may be updated with each determination that the calibration value was deemed improper or after a series of improper determinations. Alternatively, the calibration value may be updated periodically, intermittently, and/or during a defined period, such as the beginning of use or after a duration of no stud detection.

FIGS. 3–6 each illustrate a capacitance curve and an overlying calibration capacitance of an auto-recalibration system, in accordance with the present invention.

Figure 3:
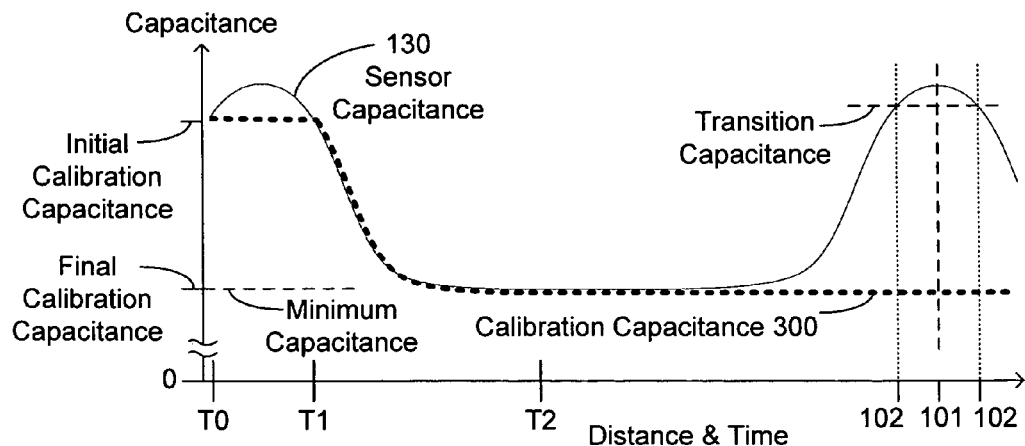
FIGS. 3–6 each illustrate a capacitance curve and an overlying calibration capacitance of an auto-recalibration system, in accordance with the present invention.

FIG. 3 shows a series of sensor measurements represented as sensor capacitance curve 130. In the scenario shown, a sensor initially sets a calibration value that represents an initial calibration capacitance at time T0. Between time T0 and time T1, the sensor measures new capacitance measurements (represented by curve 130) that are greater than the initial calibration value. The calibration value is left unchanged. At time T1, subsequent new capacitance measurements fall below the initial calibration capacitance. The calibration value may be deemed improper if a new capacitance measurement value is less than the current calibration value. The calibration value may then take the value of the lower new capacitance measurement, as shown in calibration capacitance curve 300. After a series of updates to the calibration value, an edge of a stud may be properly detected with a transition capacitance value based on the updated calibration value.

Figure 4:
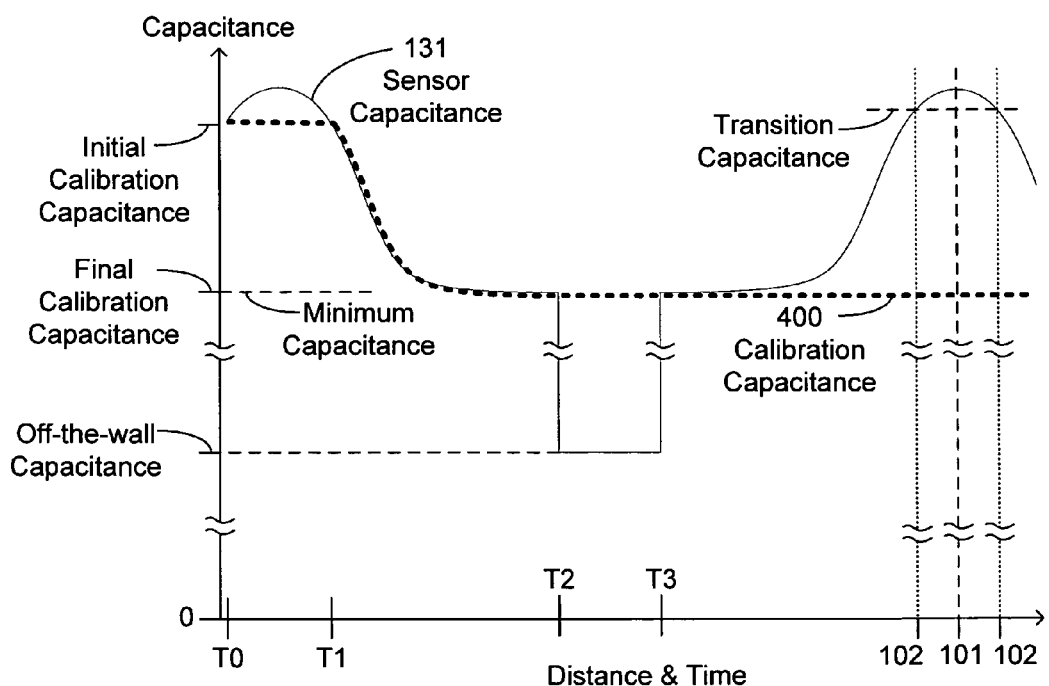

FIG. 4 shows a series of sensor measurements represented as sensor capacitance curve 131. In the scenario shown, a sensor initially may set and update a calibration value between time T0 and time T2 as described above with reference to FIG. 3. Between time T2 and time T3, the sensor may be removed from a wall or rocked away from the wall. During this time new capacitance measurements may be extremely low as shown in sensor capacitance curve 131. It may be undesirable to update the calibration value to a value substantially lower than a value that represents the capacitance of a wall. A procedure to determine whether a calibration value is improper may compare the calibration value to a new capacitance measurement. If the difference is above a threshold value, the new capacitance measurement may be considered invalid and may be ignored. In such cases, a calibration value may be left unchanged as shown in the calibration capacitance curve 400. Alternatively, calibration value may be slowly adjusted towards the lower value. For example, during each iteration an calibration value may be updated with a value equal to the calibration value decremented one percent of a difference between the calibration value and the new capacitance measurement.

Under circumstances that an operator initiates initialization while the sensor is off the wall or not at an angle flush with the wall, the sensor may erroneously set the calibration value to a value that represents a capacitance taken off of the wall. If during initialization the sensor determines that it is in a position away from the wall, the sensor may leave a calibration value at a default value or a null value. For example, a sensor may have a default initial value that represents a typical capacitance experienced by a sensor against multiple layers of sheetrock and multiple studs. Alternatively, a sensor may have a default initial value that indicates no value has been set. Alternatively, a sensor may have a default value representing a maximum possible value. Alternatively, a sensor may have a default value representing a minimum possible value.

Figure 5:
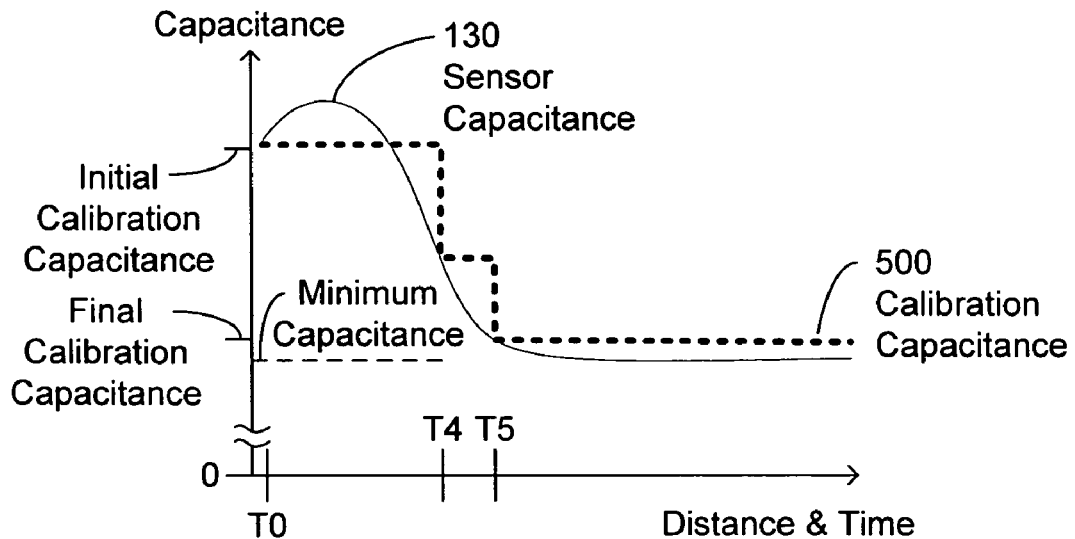

FIG. 5 shows a series of sensor measurements represented as sensor capacitance curve 130. In the scenario shown, a sensor may periodically update a calibration value. For example, at time T0, the sensor sets the calibration value to a value that represents an initial capacitance detected. Then the sensor periodically compares a new capacitance measurement to the calibration value. If the calibration value and a new capacitance measurement differ by more than a threshold amount, the sensor updates the calibration value. The threshold amount may be zero or a non-zero value. For example, at time T4 the sensor determines that the new capacitance measurement is more than a threshold amount below the calibration value. The sensor may then update the calibration value with a new value. For example, the sensor may update the calibration value with a value equal to the new capacitance measurement, as shown in the calibration capacitance curve 500 at time T4. The process repeats at the next period shown at time T5. Subsequent new capacitance measurement are within the threshold amount from the calibration value, therefore, the calibration value is not updated, as shown in the calibration capacitance curve 500 after time T5.

Figure 6:
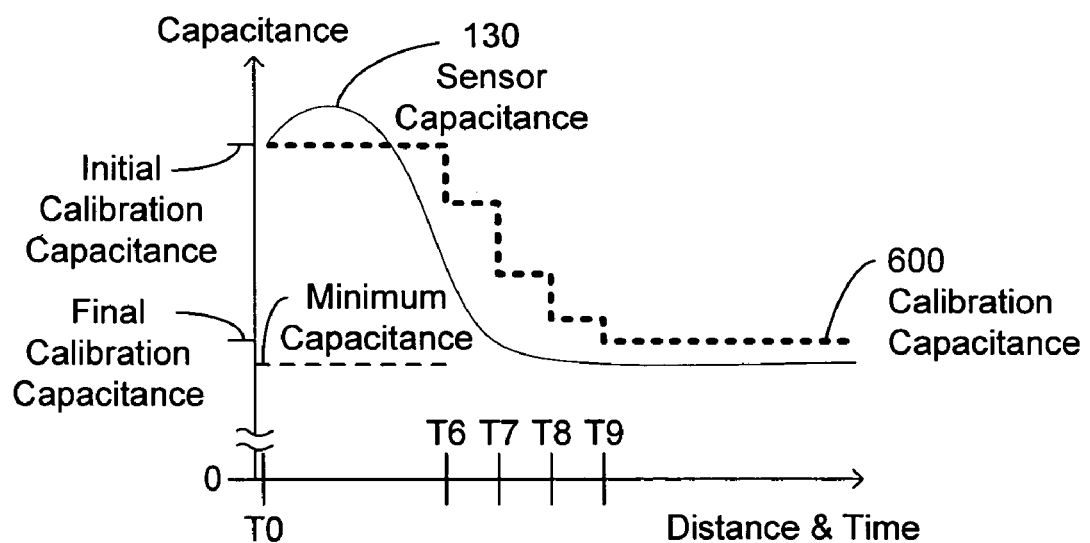

FIG. 6 shows a series of sensor measurements represented as sensor capacitance curve 130. In the scenario shown, a sensor may periodically update a calibration value as described above with reference to FIG. 5. However, instead of updating a calibration value to a value equal to a new capacitance measurement, the calibration value is decremented by a fraction of a value that represents a difference between the calibration value and the new capacitance measurement. For example, at times T6, T7, T8 and T9, the calibration value may be updated by a value that equals the calibration value less one-half of the difference between the calibration value and the new capacitance measurement, as shown in calibration capacitance curve 600. A different fraction of the difference may be used, for example, one-fourth or three-fourths. The process may continue until the calibration value approximately equals the new capacitance measurement. Alternatively, the process may continue until a difference between the calibration value and a new capacitance measurement is less than a threshold value, as shown in calibration capacitance curve 600 after time T9.

Figure 7:
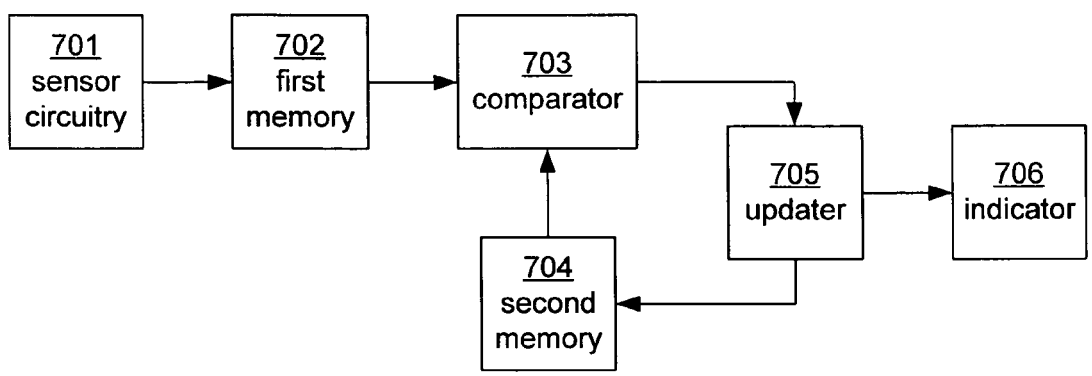
FIGS. 7–8 both show a system block diagram of an auto-recalibration system, in accordance with the present invention.
Figure 8:
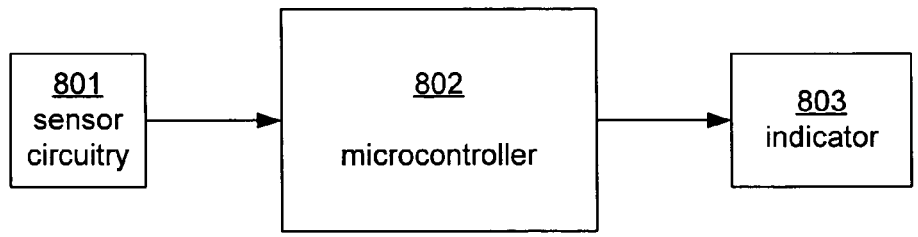

FIGS. 7–8 both show a system block diagram of an auto-recalibration system, in accordance with the present invention.

FIG. 7 represents a data flow block diagram of a sensor system after initialization. Sensor circuitry (which is conventional) 701 measures and provides a capacitance measurement. The capacitance measurement may be recorded in a first associated memory 702. A comparator 703 uses the capacitance measurement from first memory 702 and a second memory 704. Second memory 704 may be initialized with a calibration value. By comparing values in first memory 702 and second memory 704, comparator 703 determines whether the calibration value is proper or improper. If the calibration value is improper, an updater 705 may compute or determine an updated calibration value and record it in second memory 704. When updater 705 modifies second memory 704, an indicator 706 may be activated. Indictor 706 may be used to alert an operator (e.g., via sound or a display) that a mis-calibration previously occurred and the sensor is attempting to automatically recalibrate itself to correct the error.

FIG. 8 illustrates that the sensor system of FIG. 7 may be implemented using a microprocessor. For example, sensor circuitry 801 may measure and provide a capacitance measurement to a microprocessor 802 coding the software, etc. is well within the abilities of one of ordinary skill in the art in light of this disclosure, and may be accomplished using any suitable programming language. Software, firmware, assembly code, machine code or the like may be used to instruct and control microprocessor 802. Microprocessor (or microcontroller) 802 may include memory for storing a calibration value and one or more capacitance measurements and performs the functions of elements 702–705 of FIG. 7. Instructions may be used to compare or compute whether a new capacitance measurement may show that a calibration value is invalid or improper. If so, microprocessor 802 may include additional instructions to update or compute and store an updated calibration value. Furthermore, micropro- cessor 802 may be coupled to an indicator 803 to provide an alert, such as an audible and/or visual alert, to an operator.

While the invention has been described in terms of particular embodiments and illustrative figures, those of ordinary skill in the art will recognize that the invention is not limited to the embodiments or figures described. More- over, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed as new and desired to be protected by Letters Patent of the United States is:

1. A method of recalibrating a stud sensing device for finding a location of a stud positioned behind a surface, the method comprising the acts of:
    holding the stud sensing device at a first location on the surface;
    placing the stud sensing device in an calibration mode;
    sensing a first density at the first location in the calibration mode;
    setting a calibration value based on the first sensed density;
    placing the stud sensing device in an operating mode;
    moving the stud sensing device to a second location on the surface;
    sensing a second density at the second location;
    setting a second density value based on the second sensed density;
    the stud sensing device determining if it was calibrated over or near a stud; and
    the stud sensing device recalibrating itself if it determined that the stud sensing device was calibrated over or near the stud.

2. The method of claim 1, wherein the act of determining if the stud sensing device was calibrated over or near the stud includes:
    comparing the calibration value to the second density value; and
    determining that the stud sensing device was calibrated over or near the stud if the second density value is more than a threshold amount less than the calibration value.

3. The method of claim 1, wherein the act of determining if the stud sensing device was calibrated over or near the stud includes:
    comparing the calibration value to the second density value; and
    determining that the stud sensing device was calibrated over or near the stud if the second density value is between a first threshold amount under the calibration value and a second threshold amount less than the calibration value.

4. The method of claim 3, wherein the second threshold amount is an offset value from the calibration value.

5. The method of claim 3, wherein the second threshold amount is a constant value.

6. The method of claim 1, wherein the act of recalibrating the stud sensing device includes the stud sensing device resetting the calibration value based on the second density value.

7. The method of claim 6, wherein the act of resetting the calibration value based on the second density value includes the stud sensing device setting the calibration value equal to the second density value.

8. The method of claim 6, wherein the act of resetting the calibration value based on the second density value includes the stud sensing device decreasing the calibration value by a fraction of a difference between the calibration value and the second density value.

9. The method of claim 1, further comprising the acts of:
    moving the stud sensing device to a new location on the surface;
    sensing a new density at the new location;
    resetting the second density value based on the new sensed density;
    the stud sensing device determining if it was recalibrated over or near the stud; and
    the stud sensing device recalibrating itself if it determined that the stud sensing device was calibrated over or near the stud.

10. The method of claim 1, further comprising the act of indicating to a user when the stud sensing device is recali- brated.

11. The method of claim 10, wherein the act of indicating includes providing both an audible and visible indication to the user.

12. A stud sensing device capable of automatically reca- librating if it has erroneously been calibrated at a location over or near a stud, the stud sensing device comprising:
    a first memory adapted to hold a calibration value;
    a second memory adapted to hold a sensed value;
    a sensor adapted to be applied to a surface, thereby determining a density behind the surface and providing the sensed value, wherein the sensor is operationally coupled to the second memory;
    a comparator adapted to compare the first memory loca- tion to the second memory location, thereby determin- ing if the calibration value represents a value sensed over or near the stud, wherein the comparator is operationally coupled to the first and second memories; and an updater adapted to update the first memory with an updated calibration value, wherein the updater is operationally coupled to an output of the comparator.

13. The sensor of claim 12, further comprising a controller adapted to coordinate operation of the sensor, the comparator and the updater.

14. The sensor of claim 12, further comprising an indicator adapted to indicate to a user when the first memory changes, wherein the indicator is operationally coupled to the output of the comparator.

15. The sensor of claim 12, wherein the stud sensing device updates the calibration value without operator intervention.

16. The method of claim 1, wherein the device recalibrates itself by updating a calibration value without user intervention.

17. A method of recalibrating a stud sensing device for finding a location of a stud positioned behind a surface, the method comprising the acts of:
holding the stud sensing device at a first location on the surface;
placing the stud sensing device in an calibration mode;
sensing a first density at the first location in the calibration mode;
setting a calibration value based on the first sensed density;
placing the stud sensing device in an operating mode;
moving the stud sensing device to a second location on the surface;
sensing a second density at the second location;
setting a second density value based on the second sensed density;
determining whether the stud sensing device was calibrated over or near a stud;
recalibrating the stud sensing device if the stud sensing device was calibrated over or near the stud;
wherein the act of determining whether the stud sensory device was calibrated over or near a stud includes:
comparing the calibration value to the second density value; and
determining that the stud sensing device was calibrated over or near the stud if the second density value is more than a threshold amount less than the calibration value.

18. A method of recalibrating a stud sensing device for finding a location of a stud positioned behind a surface, the method comprising the acts of:
holding the stud sensing device at a first location on the surface;
placing the stud sensing device in an calibration mode;
sensing a first density at the first location in the calibration mode;
setting a calibration value based on the first sensed density;
placing the stud sensing device in an operating mode;
moving the stud sensing device to a second location on the surface;
sensing a second density at the second location;
setting a second density value based on the second sensed density;
determining whether the stud sensing device was calibrated over or near a stud;
recalibrating the stud sensing device if the stud sensing device was calibrated over or near the stud;
wherein the act of determining whether the stud sensory device was calibrated over or near a stud includes:
comparing the calibration value to the second density value; and
determining that the stud sensing device was calibrated over or near the stud if the second density value is between a first threshold amount under the calibration value and a second threshold amount less than the calibration value.

19. A method of recalibrating a stud sensing device for finding a location of a stud positioned behind a surface, the method comprising the acts of:
holding the stud sensing device at a first location on the surface;
placing the stud sensing device in an calibration mode;
sensing a first density at the first location in the calibration mode;
setting a calibration value based on the first sensed density;
placing the stud sensing device in an operating mode;
moving the stud sensing device to a second location on the surface;
sensing a second density at the second location;
setting a second density value based on the second sensed density;
determining whether the stud sensing device was calibrated over or near a stud;
recalibrating the stud sensing device if the stud sensing device was calibrated over or near the stud;
wherein the act of recalibrating the stud sensing device includes resetting the calibration value based on the second density value; and
wherein the act of resetting the calibration value based on the second density value includes setting the calibration value equal to the second density value.

20. A method of recalibrating a stud sensing device for finding a location of a stud positioned behind a surface, the method comprising the acts of:
holding the stud sensing device at a first location on the surface;
placing the stud sensing device in an calibration mode;
sensing a first density at the first location in the calibration mode;
setting a calibration value based on the first sensed density;
placing the stud sensing device in an operating mode;
moving the stud sensing device to a second location on the surface;
sensing a second density at the second location;
setting a second density value based on the second sensed density;
determining whether the stud sensing device was calibrated over or near a stud;
recalibrating the stud sensing device if the stud sensing device was calibrated over or near the stud;
wherein the act of recalibrating the stud sensing device includes resetting the calibration value based on the second density value; and
wherein the act of resetting the calibration value based on the second density value includes decreasing the calibration value by a fraction of a difference between the calibration value and the second density value.

* * * * *